(12) United States Patent  
Kume et al.

(10) Patent No.: US 7,976,901 B2
(45) Date of Patent: Jul. 12, 2011

(54) POLISHING SHEET AND MANUFACTURING METHOD OF ELASTIC PLASTIC FOAM SHEET

(75) Inventors: Takahiro Kume, Touyo (JP); Tomohiro Iwao, Touyo (JP)

(73) Assignee: Fujibo Holdings, Inc., Tokyo (JP)

( * ) Notice: Subject to any disclaimer, the term of this patent is extended or adjusted under 35 U.S.C. 154(b) by 0 days.

(21) Appl. No.: 12/464,054

(22) Filed: May 11, 2009

(65) Prior Publication Data

US 2009/0226697 A1 Sep. 10, 2009

Related U.S. Application Data (62) Division of application No. 10/798,305, filed on Mar. 12, 2004, now abandoned.

(30) Foreign Application Priority Data

Nov. 25, 2003 (JP) .................................. 2003-393700

(51) Int. Cl.
*B05D 3/10* (2006.01)
(52) U.S. Cl. ...................................................... 427/341
(58) Field of Classification Search .................. None
See application file for complete search history.

(56) References Cited

U.S. PATENT DOCUMENTS

| 3,067,482 | A | * | 12/1962 | Hollowell | ...................... 427/354 |
| 4,927,432 | A | * | 5/1990 | Budinger et al. | ................ 51/298 |
| 5,094,670 | A | * | 3/1992 | Imada | .............................. 51/293 |
| 6,913,517 | B2 | | 7/2005 | Prasad | |
| 2001/0050268 | A1 | * | 12/2001 | Reinhardt | ........................ 216/89 |
| 2005/0026552 | A1 | * | 2/2005 | Fawcett et al. | ................... 451/41 |

OTHER PUBLICATIONS

Patent Abstracts of Japan, Publication No. 05-008178, published Jan. 19, 1993, Naoto Kubo.
Patent Abstracts of Japan, Publication No. 10-249709, published Sep. 22, 1998, Hajime Shiozawa.
Patent Abstracts of Japan, Publication No. 2001-062704, published Mar. 13, 2001, Mitsuyoshi Ichino et al.

* cited by examiner

*Primary Examiner* — Erma Cameron
(74) *Attorney, Agent, or Firm* — Roberts Mlotkowski Safran & Cole P.C.

(57) ABSTRACT

A polishing sheet which can improve waviness at a face of a material to be polished and which has a long life is provided. The polishing pad 1 has a polyurethane sheet 2 made of polyurethane resin. The polyurethane sheet 2 has a polishing layer which is disposed inside a surface layer and which is allowed to wear away by polishing and whose thickness is larger than a thickness of the surface layer. The polishing layer has an approximately uniform foam structure in a direction of the thickness of the polishing sheet 2 by being formed foams whose space volume is larger than that of foams formed at the surface layer and which are communicated so as to form a network by continuous holes.

4 Claims, 4 Drawing Sheets

POLISHING SHEET AND MANUFACTURING METHOD OF ELASTIC PLASTIC FOAM SHEET

This is a divisional of U.S. patent application Ser. No. 10/798,305 filed on Mar. 12, 2004, now abandoned.

BACKGROUND OF THE INVENTION

1. Field of the Invention

The present invention relates to a polishing sheet and a manufacturing method of an elastic plastic foam sheet for the polishing sheet, and in particular relates to a polishing sheet having an elastic plastic foam sheet which is of use to precision polishing work and a manufacturing method of an elastic plastic foam sheet for the polishing sheet.

2. Description of Related Art

Conventionally, a polishing sheet is used to perform flattening work on a material required for flatness at a high accuracy, such as an optical material such as a lens, a plane parallel plate, a reflecting mirror or the like, a base plate for a hard disc, a silicon wafer, a liquid crystal glass or the like. For example, as a polishing sheet used for accurate flattening work, e.g. for the silicon wafer or the like, a polishing sheet of a nonwoven type obtained by coagulating a nonwoven fabric after the nonwoven sheet is impregnated with a resin solution is known (refer to JP05-8178A publication). However, since the polishing sheet of this type has flexibility, there are drawbacks in that a polishing efficiency is low and a roll-off, i.e., peripheral edge portions of a material to be polished are polished more than a central portion thereof, occurs easily. In order to improve the polishing efficiency, there has been disclosed a polishing sheet having an independent foam structure obtained by hollow fine spherical bodies or the like in a plastic material with a high hardness (for example, refer to JP08-500622A publication corresponding to WO94/04599). However, because the polishing sheet of this type has a high hardness, for example, when the sheet is used in polishing work for an aluminum base plate for a hard disc, there is a drawback in that defects may occur at a surface of the aluminum base plate.

On the other hand, a polishing sheet obtained by pasting a film with a high hardness or the like to an elastic plastic foam of a suede type with a foam structure produced by wet film forming process has been disclosed (for example, refer to JP10-249709A publication). An elastic plastic foam sheet is generally produced by the wet film forming process, and relatively large cells extending in a direction approximately perpendicular to a surface of the polishing sheet are formed in an interior of the elastic plastic foam sheet. A foaming surface layer (a skin layer), whose thickness is approximately several micro meters and whose surface is flat, is formed at the surface of the polishing sheet. The skin layer is removed by conducting buffing treatment in order to improve flatness of the surface of the polishing sheet, and such a polishing sheet has a honeycomb shaped cell structure that relatively large cells are opened at a surface of a polishing layer. The surface for contacting a material to be polished of the polishing sheet having such a honeycomb shaped cell structure is formed uneven. A polishing liquid is reserved by the opened relatively large cells, and the material to be polished is polished by pressing the reserved polishing liquid at a time of polishing the material. Since foreign substances such as sludge (polishing shavings) and the like are accommodated inside the large cells, scratches (polishing defects) and the like which occur at the surface of the material to be polished can be prevented.

Further, a method for polishing the surface of the material to be polished by a non-buffing type polishing sheet which retains the flat skin layer and which do not have the opened relatively large cells, by giving no buffing treatment to the surface of the above-stated elastic plastic foam sheet, has been disclosed. This method can improve waviness which is one of measurement items for evaluating flatness to the surface of the material to be polished (for example, refer to JP2001-62704A publication corresponding to U.S. Pat. No. 6,439,965). At present, the method for polishing the surface of the material to be polished by this non-buffing type polishing sheet is mainly used in secondary polishing for the aluminum base plate for the hard disc.

Thus, the method disclosed in the JP2001-62704A publication is a method for polishing the material to be polished by retaining a flat face (flatness) of the surface of the skin layer, and which can improve the waviness of the material to be polished. However, since a diameter of the opened relatively large cells changes due to abrasion at the surface of the polishing sheet and polishing performance (waviness of the surface, polishing rate) is gradually lowered, it has a disadvantage in a life span of the polishing sheet. Especially, in polishing for the aluminum base plate or the like for the hard disc having a large capacity, since lowering in the waviness at the surface causes performance dropping in the hard disc, it is required to improve both the waviness at the surface of the aluminum base plate or the like and the life span of the polishing sheet.

SUMMARY OF THE INVENTION

In view of the above circumstances, an object of the present invention is to provide a polishing sheet which can improve waviness at a face of a material to be polished and which has a long life and a manufacturing method of an elastic plastic foam sheet for a polishing sheet thereof.

In order to achieve the above object, a first aspect of the present invention is directed to a polishing sheet having an elastic plastic foam sheet, wherein the elastic plastic foam sheet has a polishing layer which is disposed inside a surface layer and which is allowed to wear away by polishing and whose thickness is larger than a thickness of the surface layer, and wherein the polishing layer has an approximately uniform foam structure in a direction of the thickness of the elastic plastic foam sheet by being formed from foams whose volume is larger than that of foams formed at the surface layer and which are communicated so as to form a network by continuous holes.

In the first aspect, the elastic plastic foam sheet has a polishing layer which is disposed inside the surface layer. Since a surface of the elastic plastic foam sheet is approximately flat due to the surface layer, the polishing sheet can polish a material to be polished with the flat surface layer, and after the surface layer is worn away, the polishing sheet can continue to polish the material to be polished with the polishing layer. Since the polishing layer has the approximately uniform foam structure in the direction of the thickness of the elastic plastic foam sheet by being formed foams whose volume is larger than that of foams formed at the surface layer and which are communicated so as to form a network by continuous holes, a polishing liquid containing abrasive particles is reserved by the foams which are uniformly formed at the polishing layer and is supplied to a polishing face of the material to be polished through the continuous holes at a time of polishing the material to be polished. Accordingly, the face of the material to be polished is polished uniformly and waviness to the face of the material to be polished can be improved.

Further, since the polishing layer is allowed to wear away by polishing and its thickness is larger than that of the surface layer, even if the polishing layer is worn away partially by polishing, the polishing sheet can polish the material to be polished continuously due to the thickness of the polishing layer. Accordingly, a polishing sheet having a long life can be obtained.

In the first aspect, in order to improve a life of the polishing sheet, it is preferable that a thickness of the polishing layer is not less than 50 μm and that the elastic plastic foam sheet is made of polyurethane. The polishing sheet may further have a supporting layer which is made of at least one selected from a flexible film, a nonwoven fabric and a woven fabric and which is disposed at one side of the elastic plastic foam sheet to support the elastic plastic foam sheet. In such a polishing sheet, since the elastic plastic foam sheet is supported by the supporting layer, the polishing sheet can be attached flatly and easily to a polishing machine. Further, if a groove for accommodating and discharging shavings (sludge) occurred from the material to be polished is formed at the surface layer and the polishing layer, occurrence of defects (scratches) at a polishing face of the material to be polished can be prevented since the shavings are removed from the face via the groove.

As one embodiment of the polishing sheet, the elastic plastic foam sheet may be integrally formed by the surface layer, the polishing layer, and an elastic layer which gives elasticity to the polishing layer. At this time, foams, whose space volume is larger than that of the foams formed at the polishing layer and which are long in the direction of the thickness of the elastic plastic foam sheet, may be formed at the elastic layer. Such a polishing sheet can contact the material to be polished approximately equally since the elastic layer deforms elastically at a time of polishing the material to be polished.

As another embodiment of the polishing sheet, the polishing sheet may have an elastic layer which gives elasticity to the polishing layer and which is disposed between the elastic plastic foam sheet and the supporting layer. In such an embodiment, if the polishing sheet further has a flexible film between the elastic plastic foam sheet and the elastic layer, the surface of the polishing sheet (elastic plastic foam sheet) is not generally influenced by a shape of the material to be polished at a time of contacting the material to be polished.

Further, in the first aspect, the surface layer may be removed from the elastic plastic foam sheet. In such an embodiment, since the polishing layer is exposed at the surface of the elastic plastic foam sheet, the polishing liquid can be reserved on the surface of the polishing layer by the foams formed at the polishing layer. It is desirable that the surface of the polishing layer is flat. At this time, it is preferable that a thickness of the polishing layer is not less than 50 μm. The elastic plastic foam sheet may be integrally formed by the polishing layer and an elastic layer which gives elasticity to the polishing layer. Further, the polishing sheet may have a supporting layer which is made of at least one selected from a flexible film, a nonwoven fabric and a woven fabric and which is disposed at one side of the elastic plastic foam sheet to support the elastic plastic foam sheet. A groove for accommodating and discharging shavings occurred from the material to be polished may be formed at the polishing layer.

A second aspect of the present invention is directed to a manufacturing method of an elastic plastic foam sheet for a polishing sheet, comprising the steps of; coating approximately uniformly a polyurethane resin emulsion, which includes a polyurethane resin, a first organic solvent that the polyurethane resin can be dissolved, and a second organic solvent whose solubility to water is smaller than that of the first organic solvent and which controls coagulation of the polyurethane resin, to a base material; and soaking the base material coated by the polyurethane resin emulsion into a coagulation liquid whose main component is water, and wherein the elastic plastic foam sheet has a polishing layer which is disposed inside a surface layer and which is allowed to wear away by polishing and whose thickness is larger than a thickness of the surface layer, and the polishing layer has an approximately uniform foam structure in a direction of the thickness of the elastic plastic foam sheet by being formed of foams whose volume is larger than that of foams formed at the surface layer and which are communicated so as to form a network by continuous holes.

In the second aspect of the present invention, since the second organic solvent is restricted to elute into the coagulation liquid whose main component is water due to that the second organic solvent included in the polyurethane resin emulsion is smaller in solubility to water than the first organic solvent, a speed of substitution between the second organic solvent and the coagulation liquid is delayed so that coagulation of polyurethane resin progresses approximately uniformly. Accordingly, the polishing sheet, where the polishing layer is disposed inside a surface layer and the polishing layer has an approximately uniform foam structure in a direction of the thickness of the elastic plastic foam sheet by being formed foams whose space volume is larger than that of foams formed at the surface layer and which are communicated so as to form a network by continuous holes, can be obtained.

In the second aspect, it is preferable that the second organic solvent is ethyl acetate, and the polyurethane resin emulsion is prepared by adding the second organic solvent of a range of from 20 parts to 45 parts to a polyurethane resin solution, that the polyurethane resin is dissolved into the first organic solvent, of 100 parts. The manufacturing method may further comprise a step of removing the surface layer from the elastic plastic foam sheet.

Further, a third aspect of the present invention is directed to a manufacturing method of an elastic plastic foam sheet for a polishing sheet, comprising the steps of; coating approximately uniformly a polyurethane resin emulsion, which includes a polyurethane resin and a third organic solvent that the polyurethane resin can be dissolved, to a base material; and soaking the base material coated by the polyurethane resin emulsion into a coagulation liquid including a fourth organic solvent and water, and wherein the elastic plastic foam sheet has a polishing layer which is disposed inside a surface layer and which is allowed to wear away by polishing and whose thickness is larger than a thickness of the surface layer, and the polishing layer has an approximately uniform foam structure in a direction of the thickness of the elastic plastic foam sheet by being formed foams whose space volume is larger than that of foams formed at the surface layer and which are communicated so as to form a network by continuous holes.

In the third aspect of the present invention, the polyurethane resin emulsion, which includes the polyurethane resin and the third organic solvent that the polyurethane resin can be dissolved, is coated approximately uniformly to the base material, and the base material coated by the polyurethane resin emulsion is soaked into the coagulation liquid including the fourth organic solvent and water. According to the third aspect, the same effects as the above second aspect can be obtained. At this time, it is preferable that a density of the fourth organic solvent in the coagulation liquid is ranged of from 20 weight percent to 50 weight percent. The manufacturing method may further comprise a step of removing the surface layer from the elastic plastic foam sheet.

BRIEF DESCRIPTION OF THE DRAWINGS

FIG. 4 is a sectional view illustratively showing polishing pads of other embodiments to which the present invention is applicable, FIG. 4A showing a polishing pad having an elastic layer in which large cells whose size (length) is as large as a half of a thickness of a polyurethane sheet are formed and which are positioned at a side of a supporting member, and FIG. 4B showing a polishing pad having a polyurethane sheet that large cells are formed between the polyurethane sheet and a supporting member;

FIG. 5 is a sectional view illustratively showing foaming structures of polishing pads, FIG. 5A showing the foaming structure of the polishing pads used for Examples 1, 4, 5 and 6, FIG. 5B showing the foaming structure of the polishing pad used for Example 3, FIG. 5C showing the foaming structure of the polishing pads used for Examples 2 and 7, FIG. 5D showing the foaming structure of the polishing pad used for Example 8, and FIG. 5E showing the foaming structure of the polishing pad used for Comparative Example 1;

DETAILED DESCRIPTION OF THE PREFERRED EMBODIMENTS

First Embodiment

A first embodiment where a polishing sheet according to the present invention is applied to a polishing pad polishing for an aluminum base plate used for a hard disc will be explained with reference to the drawings.

<Polishing Pad>

Figure 1:
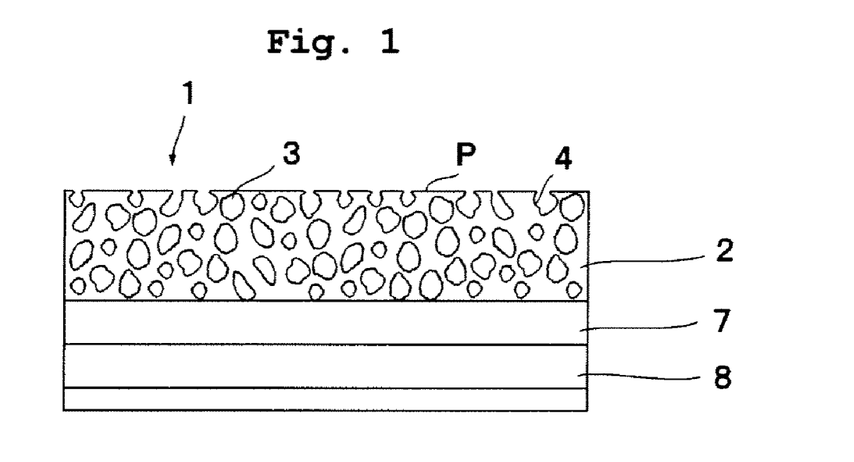
FIG. 1 is a sectional view illustratively showing a polishing pad of an embodiment to which the present invention is applicable.

As shown in FIG. 1, a polishing pad 1 has a polyurethane sheet 2 which is formed by a polyurethane resin and which serves as an elastic plastic foam sheet. A surface layer (skin layer, See numeral 9 in FIG. 6.), at which small foams are formed, is removed from the polishing pad 1. Thus, in this embodiment, the polyurethane sheet 2 constitutes a polishing layer, and the polishing layer once positioned inside the surface layer is exposed at a surface of the polyurethane sheet 2. In the polyurethane sheet 2, foams 3 which are approximately uniformly dispersed in the polyurethane resin. A volume of the foams 3 is larger than that of the foams formed at the surface layer. These foams 3 are communicated so as to form a network by unillustrated continuous holes whose diameter is smaller than that of the space volume of the foams 3. Further, the polyurethane sheet 2 (polishing layer) has an approximately uniform foam structure in a direction of its thickness. The foams 3 positioned at a vicinity of a polishing face P are opened at the polishing face P so as to form open portions 4.

The polishing pad 1 has a supporting member 7 (supporting layer), which functions as a base material at a time of manufacturing the polyurethane sheet 2, at an opposite face side (a lower face side) of the polishing face P of the polyurethane sheet 2. Such a base material, for example, is made of at least one selected from a flexible film such as a film made of polyethylene terephthalate (hereinafter abbreviated as "PET"), a nonwoven fabric, and a woven fabric. A double adhesive tape 8 for attaching the polishing pad 1 to a polishing machine, which has a peeling paper (a release paper) on one face side (a lowermost face side) thereof, is adhered to a lower face side of the supporting member 7.

<Manufacturing Process of Polishing Pad>

Figure 2:
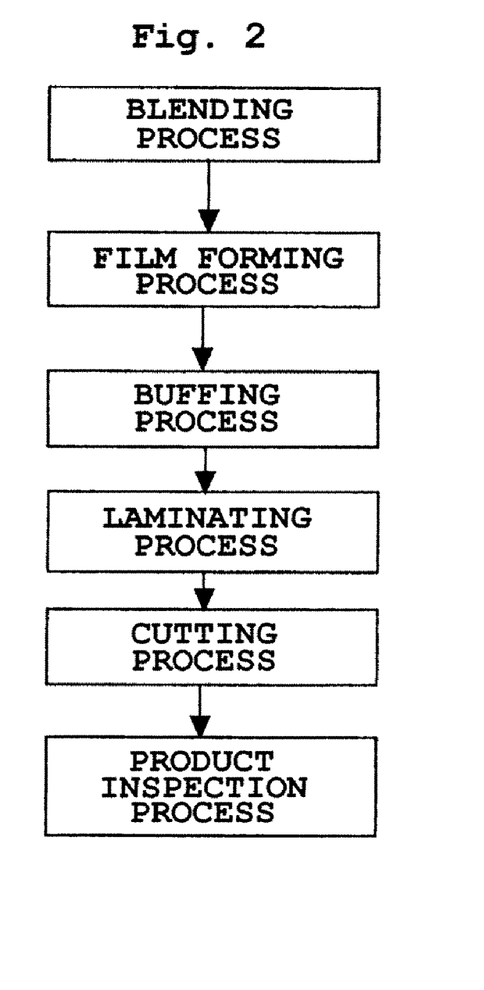
FIG. 2 is a process diagram showing manufacturing process of the polishing pad.

The polishing pad 1 according to this embodiment is manufactured by carrying out each manufacturing process shown in FIG. 2. First, a polyurethane resin, N,N-dimethyl-formaldehyde (hereinafter abbreviated as "DMF") serving as a first organic solvent, a control organic solvent serving as a second organic solvent, and additives are blended in blending process. The polyurethane resin is selected from a polyester resin, a polyether resin, a polycarbonate resin or the like. A polyurethane resin solution is obtained by dissolving the polyurethane resin into the DMF such that it occupies 30% in the solution. A predetermined amount of the control organic solvent is added in order to control viscosity of the obtained polyurethane resin solution and to control (delay) a speed of substitution between the DMF and water in film forming process as explained below. A solvent that solubility to water is smaller than that of the DMF and that can be uniformly blended with or dispersed to the polyurethane resin solution without re-solidifying (gelatinizing) the polyurethane resin dissolved in the DMF is used for the control organic solvent. As concrete examples for such a solvent, ethyl acetate, isopropyl alcohol, and the like can be listed. It is preferable that an adding amount or dosage of the control organic solvent is ranged of from 20 to 45 parts to the polyurethane resin solution of 100 parts and that additives such as pigment and the like are added to the polyurethane resin solution to be stirred and mixed sufficiently. As additives, pigment such as carbon black or the like, hydrophilic activator for accelerating foaming, hydrophobic activator of film-forming stabilizer and the like can be used in order to control the size or amount (number) of the foams 3. After aggregated masses or the like are removed by filtration, a polyurethane resin emulsion (hereinafter referred to "resin emulsion") is obtained by carrying out defoaming under vacuum.

In film forming process, the resin emulsion prepared in the blending process is continuously applied on the base material such that its thickness becomes substantially uniform by using a knife coater, and the polyurethane resin is re-solidified (reproduced and coagulated) by soaking the applied base material into a coagulation liquid to remove the DMF and the control organic solvent.

Figure 3:
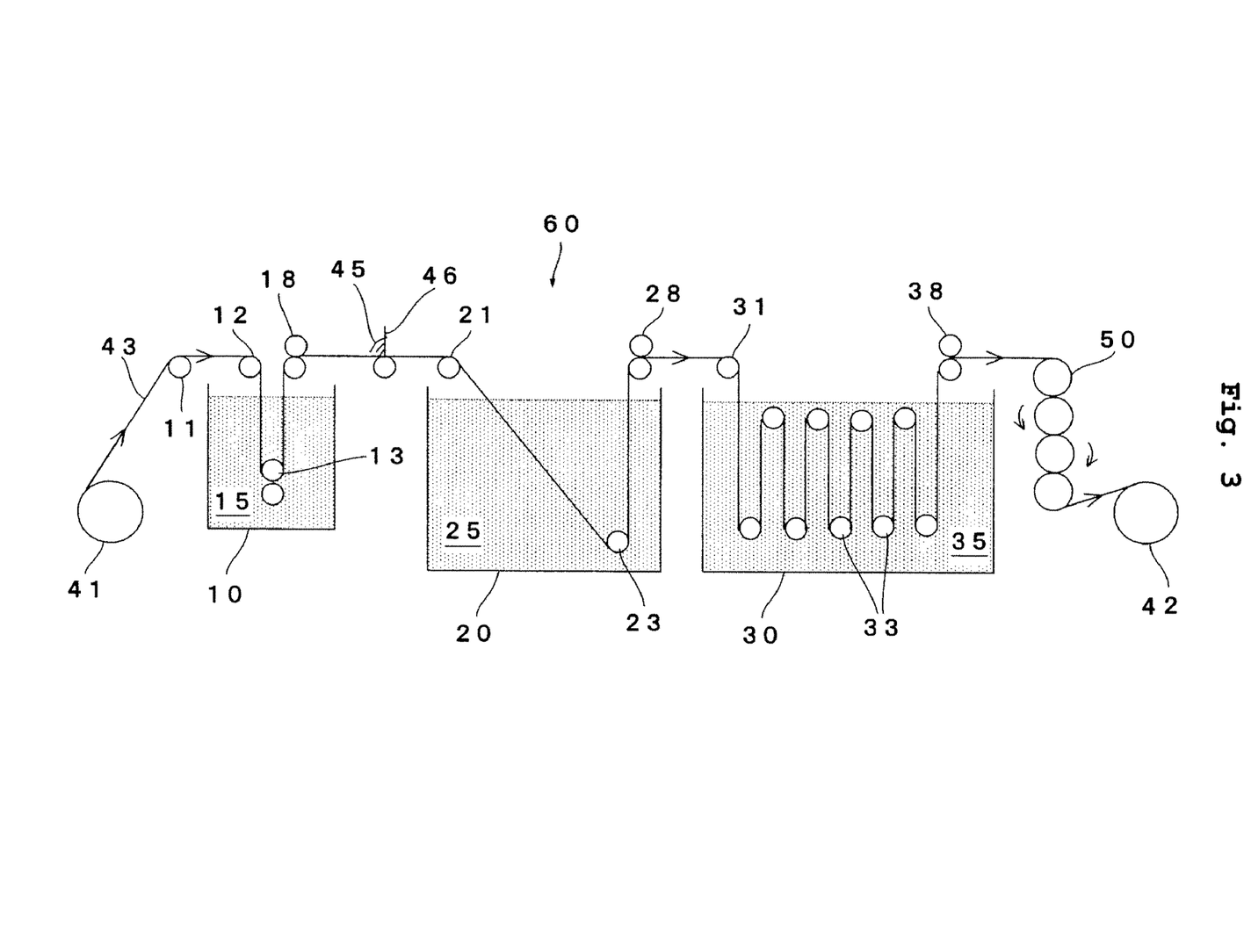
FIG. 3 is a front view showing a schematic constitution of a film forming apparatus.

The film forming process is carried out, for example, by a film forming apparatus as shown in FIG. 3. The film forming apparatus is equipped in series with a pretreatment bath 10 which is filled with a pretreatment liquid 15 such as water, DMF water solution (a mixed liquid of the DMF and water) or the like and in which the base material such as the woven fabric, the woven fabric or the like is soaked, a coagulation bath 20 which re-solidifies the polyurethane resin and which is filled with a coagulation liquid 25 whose main component is water that is a poor solvent to the polyurethane resin, and a washing bath 30 which is filled with washing 35 such as water or the like for washing the coagulated polyurethane resin, and a cylinder type drying machine 50 for drying the polyurethane resin.

A base material supplying roller 41 for supplying a base material 43 is disposed at an upstream side of the pretreatment bath 10. The pretreatment bath 10 has a pair of guide rollers 13 at a lower portion thereof and an approximately central portion in a direction of conveying the base material 43. Over a liquid level of the pretreatment liquid 15, guide rollers 11 and 12 are disposed at a side of the base material supplying roller 41, and a pair of pressure rollers 18 for dehydrating a superabundant pretreatment liquid on the pretreated base material 43 is disposed at a side of the coagulation bath 20. A knife coater 46 (a doctor knife) for coating the resin emulsion 45 approximately uniformly onto one side of the base material 43 is disposed at a downstream of the pair of pressure rollers 18. The coagulation bath 20 has a guide roller 23 at a lower portion thereof and at a side of the washing bath 30. Over a liquid level of the coagulation liquid 25, a guide roller 21 is disposed at a side of the pretreatment bath 10, and a pair of pressure rollers 28 for dehydrating the coagulation liquid 25 on the re-solidified polyurethane resin is disposed at a side of the washing bath 30. The washing bath 30 has four guide rollers 33 at an upper portion thereof and five guide rollers 33 at a lower portion thereof in a direction of conveying the base material 43 such that the base material 43 is conveyed up and down by the guide rollers 33 alternatively. Over a liquid level of the washing liquid 35, a guide roller 31 is disposed at a side of the coagulation bath 20, and a pair of pressure rollers 38 for dehydrating the washing liquid 35 on the washed polyurethane resin is disposed at a side of the cylinder type drying machine 50. In the cylinder type drying machine 50, four cylinders each having a heat source are disposed vertically such that the cylinders form four stages. A winding roller 42 for winding the dried polyurethane resin is disposed at a downstream side of the cylinder type drying machine 50. Incidentally, the pressure rollers 18, 28, 38, the cylinder type drying machine 50, and the winding roller 42 are driven by rotation force transmitted from an unillustrated rotation driving motor so that the base material 43 is conveyed from the base material supplying roller 41 to the winding roller 42 with the rotation force.

In a case that the base material 43 is the nonwoven fabric or the woven fabric, the base material 43 is drawn out from the base material supplying roller 41 and introduced (soaked) continuously into the pretreatment liquid 15 via the guide rollers 11 and 12. By conducting the pretreatment to the base material 43 with the pretreatment liquid 15 in order to close opened portions in the fabric, infiltration of the resin emulsion 45 into an interior of the base material 43 is restricted at the time of coating the resin emulsion 45. The base material 43, after pulling up from the pretreatment liquid 45, is squeezed to remove and drop the superabundant pretreatment liquid 15 by the pair of pressure rollers 18. The pretreated base material 43 is conveyed to a side of the coagulation bath 20 to apply the resin emulsion 45 which is prepared in the blending process approximately uniformly by the knife coater 46. Incidentally, since the pretreatment is not essential in a case that the base material 43 is a film made of the PET or the like, the base material 43 may be conveyed directly from the guide roller 12 to the pair of pressure rollers 18, or, the pretreatment liquid 15 may not be poured to the pretreatment bath 10.

The base material 43 which is coated by the resin emulsion 45 is introduced to the coagulation liquid 25 via the guide roller 21. In the coagulation liquid 25, the skin layer with a thickness of several micron meters (μm) is formed at a surface of the coated resin emulsion 45. Thereafter, the polyurethane resin is re-solidified by a progress of substitution between the DMF in the resin emulsion 45 plus the control organic solvent and the coagulation liquid 25. At a time of deliquoring the DMF and the control organic solvent, the foams 3 are formed inside the polyurethane resin such that a continuously foamed body is formed. The re-solidified polyurethane resin is pulled up from the coagulation liquid 25 and introduced to the washing liquid 35 via the guide roller 31 after removing and dropping the superabundant coagulation liquid 25 by the pair of pressure rollers 28.

The polyurethane resin is washed by passing through the guide rollers 33 up and down alternatively in the washing liquid 35. The polyurethane resin is pulled up from the washing liquid 35 after washing, and it is squeezed to remove and drop the superabundant washing liquid 35 by the pair of pressure rollers 38. Then, the polyurethane resin is passed through alternatively along each circumference of the four cylinders of the cylinder type drying machine 50 (See arrows in FIG. 3.), so that the polyurethane resin is dried. The dried polyurethane resin is wound by the winding roller 42.

By the way, the foams 3 are dispersed approximately uniformly in a direction along a thickness of the obtained sheet-shaped polyurethane resin, and the foams 3 are communicated so as to form the network by the continuous holes. By adding the control organic solvent to the polyurethane resin solution in the blending process, the progress of the substitution between the DMF in the resin emulsion 45 plus the control organic solvent and the coagulation liquid 25 is delayed at a time of soaking into the coagulation liquid 25 in the film forming process. Accordingly, the polishing layer, which is disposed inside the skin layer that is formed at the surface of the polyurethane resin, has a thickness of not less than 50 μm and has an approximately uniform foam structure in a direction of a thickness thereof.

As shown in FIG. 2, in buffing process, buffing (surface sanding) treatment is conducted to a surface at a side of the polishing face P of the obtained sheet-shaped polyurethane resin to remove the skin layer formed at the surface of the polyurethane resin. Thus, a part of the foams 3 is opened at the polishing face P to form the open portions 4.

In laminating process, one face of the double adhesive tape 8 with a peeling paper attached to another face thereof is adhered to a face opposite to the polishing face P of the base material 43 (supporting member 7), and in cutting process, dies cutting is performed so as to obtain a desired shape such as, for example, a circle or the like. In product inspection process, inspection is made for confirming that there is neither stain nor adhesion of scraps, such as buffs or the like, on the product (polishing pad 1), so that the manufacturing of the polishing pad 1 is finished.

<Effects of Polishing Pad>

In the conventional wet film forming process, a resin emulsion that the polyurethane resin is dissolved into the DMF and additives are mixed thereto is coated to the base material, and the coated base material is soaked into a coagulation liquid of which main component is water. Since the DMF is a solvent used generally for dissolving the polyurethane resin and it can be blended to water at an optional rate, first, substitution (re-solidification of the polyurethane resin) at a surface of the resin emulsion between the DMF and the coagulation liquid occurs, so that a skin layer is formed. Then, because the coagulation liquid enters into an interior of the resin emulsion from portions where the coagulation liquid is easy to enter at the skin layer, portions where the substitution between the DMF and the coagulation liquid progresses rapidly and portions where the substitution thereof delays occur. As a result of this, relatively large cells are formed at the re-solidified polyurethane resin. In a case that a film made of the PET, etc. that prevents infiltration of water is used for the base material, the large cells are shaped like a trigonal pyramid having a largely rounded configuration at a side of the base material because the DMF elutes only from the coating side of the resin emulsion.

In such a polishing pad using the conventional polyurethane resin, a polishing rate thereof or the like changes due to that a diameter of the large cells that are opened at the polishing face changes when the polyurethane resin is worn away according to polishing. Therefore, in primary polishing, since such a polishing pad can only utilize one fourth of a thickness thereof, a life of the polishing pad becomes short. In secondary polishing, a non-buffing type polishing pad without removing the skin layer is mainly used, but a life of such a polishing pad becomes short in the same manner.

Inventors realized that the large cells are formed at the re-solidified polyurethane resin due to differences in the speed of the substitution between the DMF and water, and based on this realization, Inventors had an idea that it is possible to eliminate or control the formation of the large cells by making the speed of the substitution late to re-solidify the polyurethane resin slowly. Besides, Inventors discovered that the speed of the substitution can be dropped by adding to the polyurethane resin solution the control organic solvent, (a) which can be uniformly dispersed to the DMF without re-solidifying the polyurethane resin dissolved in the DMF, and (b) of which solubility to water is smaller than that of the DMF.

In the present embodiment, the resin emulsion 45 is obtained by adding the control organic solvent to the polyurethane resin solution. Since the solubility to water of the control organic solvent is smaller than that of the DMF, the elution of the control organic solvent into water (the coagulation liquid 25) delays comparing with that of the DMF. Since the control organic solvent is blended with the resin emulsion 45, an amount of the DMF in the resin emulsion 45 becomes small. Accordingly, the speed of the substitution between the DMF plus the control organic solvent and the coagulation liquid 25 is delayed, so that the formation of the large cells is eliminated. Thus, the polishing layer that a thickness thereof is larger than that of the skin layer and that the foams 3 are dispersed approximately uniformly is formed inside the skin layer in the polyurethane resin. Because the speed of the substitution between the DMF plus the control organic solvent and the coagulation liquid 25 is low, a space volume of the foams 3 becomes larger than that of the foams formed at the skin layer which is formed soon after soaking into the coagulation liquid 25. Further, since the foams 3 are formed according to the deliquoring of the DMF and the control organic solvent, the foams 3 are communicated so as to form the network by the continuous holes. Therefore, the obtained polyurethane resin has the approximately uniform foam structure in the direction of a thickness thereof and has the approximately uniform foam structure without the large cells within a range of not less than 50 µm from a surface thereof for polishing the material to be polished.

In the polishing pad 1 having the obtained polyurethane resin, the polishing liquid which is supplied at the time of polishing is reserved by the foams 3 formed at the polishing layer. The polishing liquid is allowed to move via the continuous holes communicated between the foams 3 and it is supplied to a face of the material to be polished via the open portions 4. Accordingly, since the polishing liquid is supplied between the face of the material to be polished and the surface of the polishing pad 1, the face of the material to be polished is polished approximately evenly so that waviness of the face of the material to be polished is improved. Further, since the polishing pad 1 has the approximately uniformly formed polishing layer with the thickness of not less than 50 µm, even if the polishing layer is worn away at the time of polishing, the structure of the surface does not change within a range of the thickness of the polishing layer. Therefore, the polishing pad 1 can polish the material to be polished stably according to the thickness of the polishing layer, so that a life of the polishing pad 1 is enhanced.

Second Embodiment

Next, a second embodiment where a polishing sheet according to the present invention is applied to a polishing pad polishing for an aluminum base plate used for a hard disc will be explained. In a manufacturing method of the polishing pad according to this embodiment, re-solidification of the polyurethane resin is delayed by a high density DMF in a coagulation liquid, in stead of adding the control organic solvent to the polyurethane resin solution explained in the first embodiment. Incidentally, in this embodiment, the same apparatus and members as those in the first embodiment are denoted by the same reference numerals and an explanation thereof is omitted, and only different portions will be explained. Further, in this embodiment, examples where the DMF densities in the coagulation liquid are 20 weight % and 40 weigh % are shown just for simplification in explanation, however, the DMF density is allowed to take in a range of from 20 weight % to 50 weight % as will be explained later.

The resin emulsion 45 is prepared by adding additives after dissolving the polyurethane resin into the DMF. The resin emulsion 45 is diluted by the DMF in order to control viscosity thereof in the film forming process. In order to delay the re-solidification of the polyurethane resin, the coagulation liquid 25 is prepared by blending water and the DMF such that the density of the DMF becomes 20 weight % or 40 weight %.

In the second embodiment, since elution of the DMF to the resin emulsion 45 is restrained by setting the density of the DMF in the coagulation liquid high, the speed of the substitution between the DMF in the resin emulsion 45 and the coagulation liquid 25 is delayed. Accordingly, since the re-solidification of the polyurethane resin becomes slow, the obtained polyurethane resin has the polishing layer which is disposed inside the skin layer and which is not formed the large cells, and the polishing layer has the approximately uniform foam structure in which the foams 3 are dispersed approximately uniformly in the direction of its thickness.

Incidentally, in the above embodiments, the polyurethane resin sheet was exemplified as the elastic plastic foam sheet, however, this invention is not limited to this exemplification. For example, a resin, which forms a continuous foam body, such as a polyester resin and the like may be used. In a case that the polyester resin is used, continuous foams may be easily formed according to the wet film forming process. Further, in the above embodiments, the wet film forming process was exemplified in the process for manufacturing the polyurethane sheet, however, the dry film forming process may be used. At this time, for example, hydrophilic activator or the like for promoting foaming may be added to form the continuous foam body.

Figure 4A:
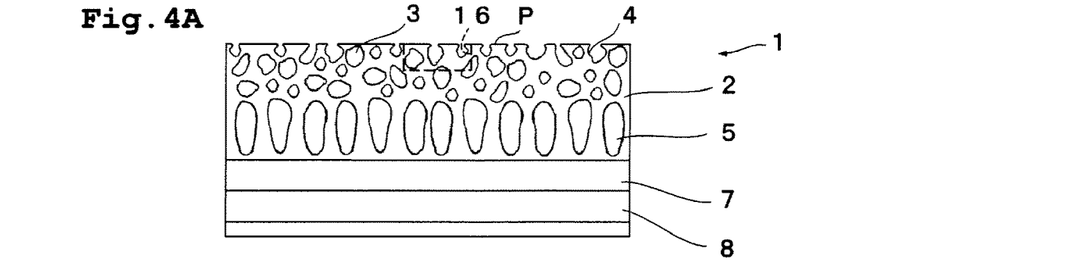
Figure 4B:
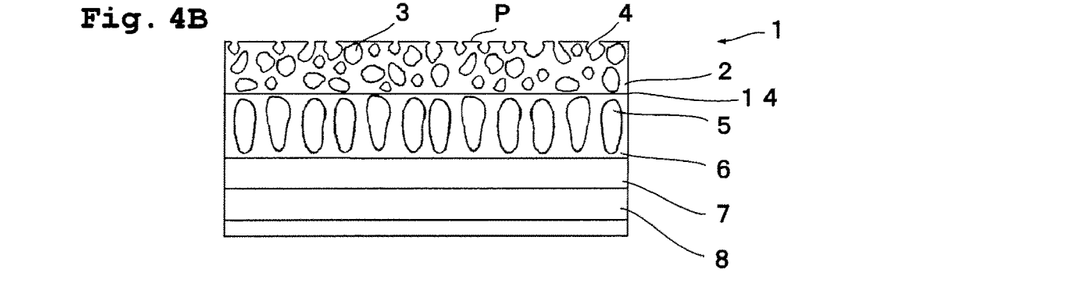

Further, in the above embodiments, the polishing pad 1 that the polyurethane resin is re-solidified onto the base material 43 which is the supporting member 7 was shown, however, this invention is not confined to the same. For example, as shown in FIG. 4A, the sheet shaped polyurethane resin may have large cells 5 which are approximately as long as a half of the thickness of the polyurethane resin and which are positioned below the foams 3. At this time, a polishing pad may be obtained by pasting the supporting member 7 and the double adhesive tape 8 to a side of the large cells 5 in the sheet shaped polyurethane resin. In such a polishing pad, since a layer that the large cells 5 are formed in the polyurethane resin functions as an elastic layer which gives elasticity to the polishing pad, the polishing sheet can contact the material to be polished approximately equally at the time of polishing. Accordingly, this polyurethane sheet is integrally form by the polishing layer and the elastic layer. Furthermore, as shown in FIG. 4B, the polishing pad may have a multi-layer (three-layer) structure where a conventional sheet shaped polyurethane resin 6 that the large cells 5 are formed is pasted to the polyurethane sheet 2 that the foams 3 are formed, and the supporting member 7 and the double adhesive tape 8 are pasted to an opposite side of the polyurethane sheet 2 of the polyurethane resin 6. Since the polyurethane sheet 2 functions like the skin layer, a polishing pad equivalent to the conventional polishing pad of which the skin layer is made thicker may be obtained. In that case, the polishing pad may further have a flexible film 14 made of polyolefin, etc. between the polyurethane sheet 2 and the polyurethane resin 6. A face of the polishing sheet is hardly influenced by a shape of the material to be polished at a time of contacting the polishing sheet with the material to be polished.

Furthermore, in the above embodiments, the sheet shaped polyurethane resin where the buffing treatment was conducted to the surface at the side of polishing face P was shown, however, this invention is not limited to the same. For example, the skin layer may be removed by a cutter or by means of laser beams. It is without saying that the polishing pad can be used without conducting the buffing treatment. In such a polishing pad, since the surface of the skin layer is flat, if only the surface of the skin layer is removed by dressing (slight surface sanding), the skin layer can reserve the polishing liquid. Such a polishing pad can polish the material to be polished with the skin layer whose surface is flat, and even if the skin layer is worn away, the polishing pad can continue to polish the material to be polished with the polishing layer.

Further, as shown in FIG. 4A, the polishing pad may have a groove 16 for accommodating and discharging shavings occurred from the material to be polished formed at the polishing layer (and the skin layer) of the polyurethane sheet 2. In such a polishing pad, since the shavings are removed from the polishing face P via the groove 16, occurrence of defects at the face of the material to be polished can be prevented. The groove 16 also contributes to a supply of the polishing liquid. Such a groove may be formed by a mechanical or chemical method such as machine work, laser beam work, or etching work. The width, the depth, or the number of the grooves is not limited, but it is preferable that the groove (s) can remove the shavings without obstructing polishing characteristics such as flatness, a polishing rate, and the like. The grooves may be formed like a lattice, concentric circulars, radial straight lines, or a combination of these. It is desirable that the groove(s) is/are continuous from an inner side to an outer side of the polishing pad.

Further, in the above embodiments, the film made of the PET for the base material 43 was shown, however, this invention is not limited to the same. For example, a flexible film made of polyolefin and the like, a nonwoven fabric or a woven fabric made of synthetic fiber and the like, may be used. In a case that such a film is used for the base material 43, after coating the resin emulsion 45 and re-solidifying the polyurethane resin, a film of the polyurethane sheet 2 may only be obtained by peeling off from the base material 43. The obtained film of the polyurethane sheet 2 may be used for the polishing pad as a single substance. In such a case, the supporting member 7 such as, for example, a high hardness resin film made of the PET and the like, a nonwoven or woven fabric made of synthetic fiber, or the conventional polyurethane foam sheet may be pasted to the film of the polyurethane sheet 2.

Furthermore, in the above embodiments, the coating of the resin emulsion 45 by the knife coater 46 was exemplified, however, for example, a reverse coater or a roll coater may be used. Any coater may be used as long as it can allow uniform coating to the base material. Besides, in the above embodiments, the cylinder type drying machine 50 for drying the polyurethane resin was shown, however, this invention is not limited to this. For example, a hot air drying machine may be used instead.

Further, in the first embodiment, the example where, after the polyurethane resin is dissolved into the DMF, the control organic solvent is added thereto, was explained, however, this invention is not limited to this. For example, the polyurethane resin may be dissolved to a mixed solvent which is mixed by the DMF and the control organic solvent.

Furthermore, in the second embodiment, the example where the DMF density of the coagulation liquid 25 was set to 20 weight % or 40 weight % was explained, however, this invention is not limited to the same. Inventors have confirmed that the formation of the large cells is eliminated as long as the DMF density of the coagulation liquid 25 ranges from 20 to 50 weight %.

Next, examples of the polishing pad 1 manufactured according to the above embodiments will be explained. Incidentally, a comparative example of the polishing pad manufactured for comparison will also be described.

Example 1

As shown in the following Table 1, in Example 1, polyester MDI (diphenylmethane diisocyanate) polyurethane resin was uses as the polyurethane resin according to the first embodiment. The resin emulsion 45 was prepared by adding and blending ethyl acetate of 45 parts as the control organic solvent, a DMF dispersing liquid of 40 weight parts including carbon black of 30% as the pigment, and a hydrophobic activator of 2 weight parts as the film-forming stabilizer, to 30% polyurethane resin solution of 100 weight parts. The coagulation liquid 25 was heated to 40 degrees Celsius. The polishing pad 1 was manufactured by, after coating the resin emulsion 45 onto the flexible film to form the film the polyurethane sheet 2, pasting the film made of the PET as the supporting member 7 to the polyurethane sheet 2 which was peeled off from the flexible film. Incidentally, in Table 1, X expresses the number of adding parts of the ethyl acetate to the polyurethane resin solution of 100 parts. When X is short of 45, the DMF of (45−X) parts was added.

TABLE 1

|  | NUMBER OF ADDING PARTS OF ETHYL ACETATE(X) |
|---|---|
| COMPARATIVE EXAMPLE 1 | 0 |
| EXAMPLE 2 | 10 |
| EXAMPLE 3 | 20 |
| EXAMPLE 4 | 30 |
| EXAMPLE 5 | 40 |
| EXAMPLE 1 | 45 |

Examples 2 to 5

As shown in Table 1, in Examples 2 to 5, the same conditions as those in Example 1 were employed except for a difference in the number of adding parts of the ethyl acetate. The number of adding parts of the ethyl acetate was respectively set to 10 (parts) in Example 2; 20 (parts) in Example 3; 30 (parts) in Example 4; and 40 (parts) in Example 5.

Comparative Example 1

As shown in Table 1, in Comparative Example 1, the same conditions as those in Example 1 were employed other than adding the DMF of 45 parts, instead of adding the ethyl acetate. Therefore, the polyurethane sheet according to Comparative Example 1 was manufactured by the conventional manufacturing method which does not add the control organic solvent.

Example 6

As shown in the following Table 2, in Example 6, water and the DMF were blended for the coagulation liquid 25 such that the DMF density is set to 40 weight % according to the second embodiment, and a temperature of the coagulation liquid 25 was set to 20 degrees Celsius.

TABLE 2

|  | DMF DENSITY OF COAGULATION LIQUID (%) | TEMPERATURE OF COAGULATION LIQUID (° C.) |
| --- | --- | --- |
| EXAMPLE 6 | 40 | 20 |
| EXAMPLE 7 | 20 | 50 |
| EXAMPLE 8 | 1 | 70 |

Examples 7 and 8

As shown in Table 2, in Examples 7 and 8, the same conditions as those in Example 6 were employed except for the DMF density and the temperature of the coagulation liquid 25. In Example 7, the DMF density was set to 20 weight % and the temperature was set to 50 degrees Celsius; and in Example 8, the DMF density was set to 1 weight % and the temperature was set to 70 degrees Celsius.

(Evaluation of Foam Structure)

Each foaming structure in the manufactured polishing pads according to Examples and Comparative Example was evaluated by observing the sections of the polyurethane sheets 2 with an electron microscope. Regarding Example 1 to Examples 5 and Comparative Example 1, evaluation results about existence/nonexistence of the large cells and film forming characteristic are shown in the following Table 3, and regarding Example 6 to Example 8, evaluation results about existence/nonexistence of the large cells are shown in the following Table 4.

TABLE 3

|  | FILM FORMING CHARACTERISTIC | LARGE CELLS |
| --- | --- | --- |
| COMPARATIVE EXAMPLE 1 | GOOD | EXISTED |
| EXAMPLE 2 | GOOD | EXISTED |
| EXAMPLE 3 | GOOD | EXISTED (A FEW) |
| EXAMPLE 4 | GOOD | NON |
| EXAMPLE 5 | GOOD | NON |
| EXAMPLE 1 | GOOD | NON |

Figure 5A:
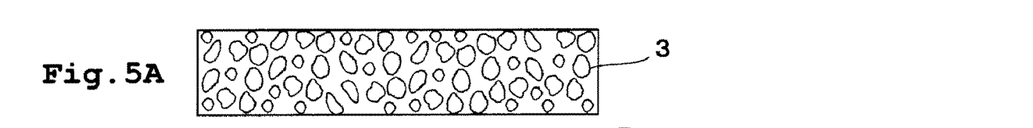
Figure 5B:
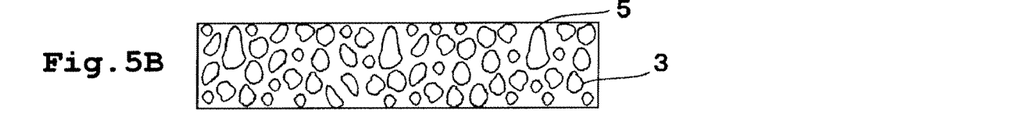
Figure 5C:
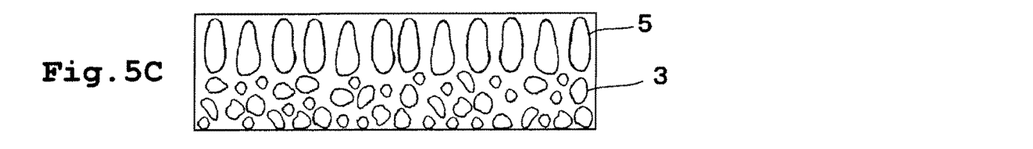
Figure 5D:
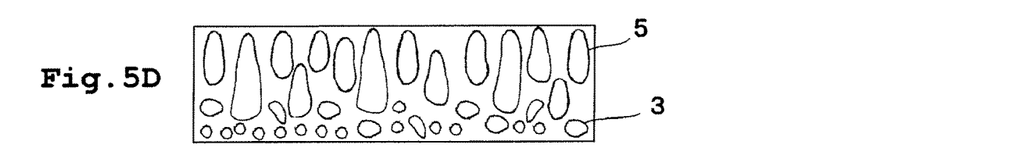
Figure 5E:
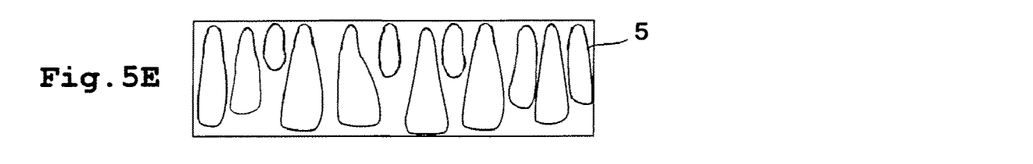

As shown in Table 3, in each Example and Comparative Example 1, the film forming characteristic of each polyurethane sheet 2 was good, i.e., there was no trouble in forming the film of the polyurethane sheet 2. Large cells were observed from the polyurethane sheet 2 of Comparative Example 1 which was manufactured by the conventional manufacturing method. In contrast, no large cells were observed from each polyurethane sheet 2 of Examples 1, 4 and 5 that the ethyl acetate as the control organic solvent was added to the resin emulsion 45. In the polyurethane sheet 2 of Example 3, a few of large cells were formed. In the polyurethane sheet 2 of Example 2, large cells were observed at a side of the coagulation liquid 25 of the coagulation time (an opposite side of the base material). FIG. 5 is illustrative comparison of the observed results. As shown in FIG. 5E, in Comparative Example 1, large cells shaped like a trigonal pyramid having a largely rounded configuration at a side of the base material (a lower side) were formed. In contrast, in Examples 1, 4 and 5, no large cells were formed, but the foams 3 were formed approximately uniformly in a direction of the thickness of the polyurethane sheet 2 as shown in FIG. 5A. In Example 3, a few of large cells 5 were observed at an opposite side of the base material (an upper side) as shown in FIG. 5B. In Example 2, large cells 5 of which size (length) is as large as a half of the thickness of the polyurethane sheet were formed at an opposite side of the supporting member, and the foams 3 were formed approximately uniformly at a side of the supporting member as shown in FIG. 5C. Accordingly, it was confirmed that the large cells are restrained by setting the adding amount of the ethyl acetate to the polyurethane resin solution of 100 parts, to a range of from 20 parts to 45 parts.

TABLE 4

|  | LARGE CELLS |
| --- | --- |
| EXAMPLE 6 | NON |
| EXAMPLE 7 | LARGE CELLS EXISTED AT UPPER HALF AND CONTINUOUSLY FOAMED BODY EXISTED AT LOWER HALF. |
| EXAMPLE 8 | EXISTED |

As shown in Table 4, in Example 6, no large cells 5 were observed. (See FIG. 5A.) In Example 7, large cells 5 of which size is as large as a half of the thickness of the polyurethane sheet were formed at an opposite side of the supporting member, and the foams 3 were formed approximately uniformly at a side of the supporting member. (See FIG. 5C.) In Example 8, as shown in FIG. 5D, large cells 5 of which size is as large as two thirds of the thickness of the polyurethane sheet were formed at an opposite side of the supporting member. Accordingly, in a case that the DMF density of the coagulation liquid 25 is 40 weight %, no large cells 5 are formed even under a normal temperature (20 degrees Celsius), and a continuously foamed structure that the foams 3 are formed approximately uniformly is formed. In a case that the DMF density of the coagulation liquid 25 is set to 20 weight % and the temperature of the coagulation liquid 25 is set to 50 degrees Celsius, the large cells 5 of which size (length) is as large as the thickness are formed (See FIG. 5C.). However, the polishing pad 1 where the polyurethane resin having the large cells 5 is served as the elastic layer can be obtained by conducting the buffing treatment to cut off the upper half portion in order to use the lower half portion as the polishing layer (See FIG. 4B.), or by utilizing the polyurethane sheet 2 per se such that the lower half portion functions as the polishing layer (See FIG. 4A.).

Figure 6:
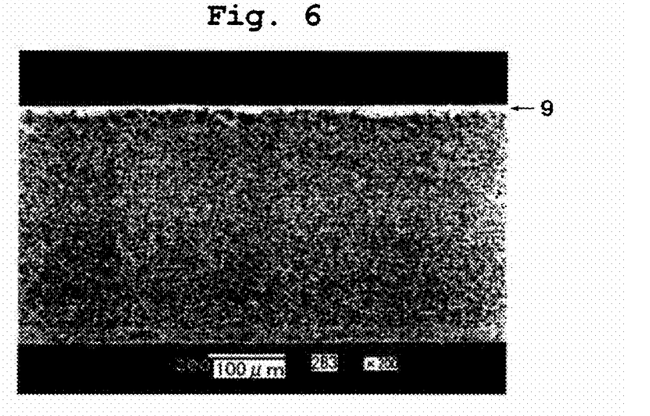
FIG. 6 shows an electron microscopic photograph of a sectional view of the polishing pad used for Example 6.
Figure 7:
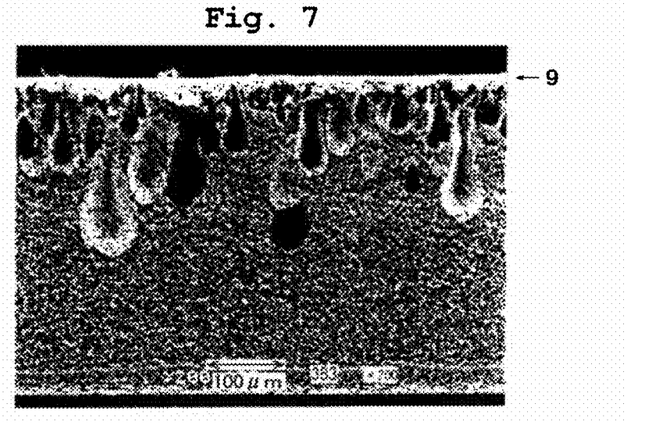
FIG. 7 shows an electron microscopic photograph of a sectional view of the polishing pad used for Example 7.
Figure 8:
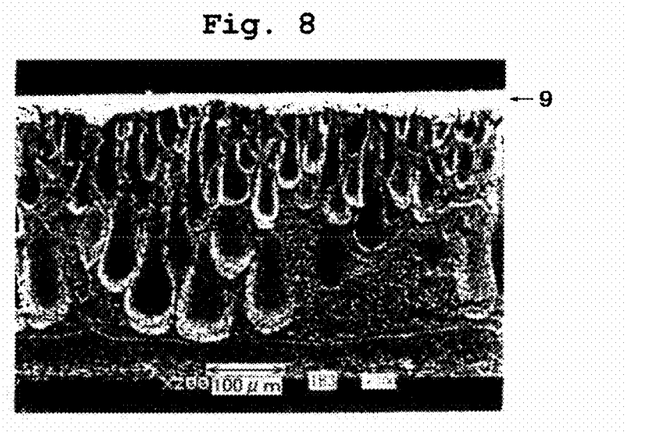
FIG. 8 shows an electron microscopic photograph of a sectional view of the polishing pad used for Example 8.

FIGS. 6, 7, and 8 are electron microscopic photographs at a time of observing each sectional view of the polyurethane sheets 2 used for Example 6 to Example 8. As obvious from FIG. 6, since the polyurethane sheet 2 of Example 6 has the polishing layer at which the foam structure is formed approximately uniformly in a direction of the thickness (a longitudinal direction of FIG. 6), the polyurethane sheet 2 can be used for polishing until the whole portion of the polishing layer is worn away. As shown in FIG. 7, in the polyurethane sheet 2 of Example 7, the large cells 5 of which size (length) is as large as a half of the thickness of the polyurethane sheet 2 are formed. As shown in FIG. 8, in the polyurethane sheet 2 of Example 8, the large cells 5 of which size (length) is as large as two thirds of the thickness of the polyurethane sheet 2 are formed. Incidentally, in FIG. 6 to FIG. 8, the polyurethane sheets 2 before conducting the buffing treatment are used as samples for observation, so that skin layers 9 are observed.

(Polishing Performance)

Next, by using the polishing pads of Example 1 and Comparative Example 1, polishing work for polishing the aluminum base plate was conducted under the following polishing conditions, and polishing performance according to a polishing rate and waviness was evaluated. Further, regarding polished aluminum base plates, appearance evaluation about presence/absence of defect occurrence to surfaces of the aluminum base plates was made.

<Polishing Conditions>

Used Polishing Machine: 9B-5P POLISHING MACHINE manufactured by SPEEDFAM CO., LTD.

Polishing Speed (Rotating Speed): 30 rpm
Working Pressure: 90 g/cm$^2$
Slurry: alumina slurry (average particle diameter: 0.8 µm)
Slurry Supplying Amount: 100 cc/min
Material to be Polished: aluminum base plate for 95 mmφ hard disc (NiP plated magnetic disc substrate)
Polishing Time: 200 sec.; 240 sec.; 300 sec.

<Polishing Rate>

The polishing rate is one of numerical values indicating a polishing efficiency and it represents a polishing amount per one minute with a thickness. Weight reduction of the aluminum base plate was calculated from measured weight before the polishing work and measured weight after the polishing work, and then the polishing rate was calculated from the polished area and the specific gravity of the aluminum base plate.

<Waviness>

Waviness is one of measurement items for evaluating a surface accuracy (flatness) to a disc base plate, a silicon wafer or the like, it is expressed with angstrom unit (Å) to a waviness amount (Wa) per unit area of a surface image which is observed by an optical non-contacting surface roughness tester. Evaluation was made by using the "Optiflat" as a test and evaluation machine. In particular, in a disc base plate used for a fixed magnetic disc (a hard disc) device used in combination with a floating type magnetic head, since floating property of the magnetic head deteriorates according to an increase of this waviness, it is important to suppress the waviness as small as possible during the polishing work. As the measured numerical value becomes lower, the waviness becomes small, accordingly, which means that a more flat face is realized.

Regarding the polishing performance about the polishing pads of Example 1 and Comparative Example 1, evaluation results of the polishing rate is shown in the following Table 5, and evaluation results of the waviness is shown in the following Table 6, respectively. In the polishing work according to the polishing pads of Example 1 and Comparative Example 1, no defects at each of surfaces of the aluminum base plates were observed.

TABLE 5

| | POLISHING RATE (µm/min.) | | | |
| --- | --- | --- | --- | --- |
| | POLISHING TIME (SEC.) | | | |
| | 200 | 240 | 300 | AVERAGE |
| COMPARATIVE EXAMPLE 1 | 0.30 | 0.32 | 0.32 | 0.32 |
| EXAMPLE 1 | 0.22 | 0.23 | 0.19 | 0.21 |

As shown in Table 5, in the polishing pad of Comparative Example 1 which was manufactured by the conventional manufacturing method, an average of the polishing rate was 0.32 µm/min. In contrast, in the polishing pad of Example 1 which was manufactured by adding the ethyl acetate to the polyurethane resin solution, an average of the polishing rate became 0.21 µm/min, which went down to about two thirds of Comparative Example 1. Comparing with the polishing pad of Comparative Example 1 at which the large cells 5 that reserve the slurry (polishing liquid) are formed, the polishing pad 1 of Example 1 at which the foams 3 whose size (space volume) is smaller than that of the large cells 5 are approximately uniformly formed without such large cells. Accordingly, it is considered that the polishing rate of Example 1 was lowered since the foams 3 which reserve the polishing liquid are small and an actual amount of the polishing liquid which is supplied to the polishing face becomes small.

TABLE 6

| | | | COMPARATIVE EXAMPLE 1 | EXAMPLE 1 |
| --- | --- | --- | --- | --- |
| WAVINESS (Å) | POLISHING TIME 200 SEC. | BEFORE POLISHING | 15.2 | 16.1 |
| | | AFTER POLISHING | 13.8 | 7.0 |
| | | DIFFERENCE | 1.4 | 9.1 |
| | POLISHING TIME 240 SEC. | BEFORE POLISHING | 14.5 | 16.5 |
| | | AFTER POLISHING | 12.6 | 6.3 |
| | | DIFFERENCE | 1.9 | 10.2 |
| | POLISHING TIME 300 SEC. | BEFORE POLISHING | 15.7 | 17.6 |
| | | AFTER POLISHING | 10.6 | 5.6 |
| | | DIFFERENCE | 5.1 | 12.0 |

As shown in Table 6, in the polishing pad of Comparative Example 1, improvement in waviness at the polished surface of the aluminum base plate was small. Even in the polishing time of 300 seconds, the difference of the waviness between before and after polishing was 5.1 Angstrom and it was small. In contrast, in the polishing pad 1 of Example 1, waviness at the polished surface of the aluminum base plate was improved largely and the aluminum base plate having excellent flatness on its surface could be obtained. Even in the short polishing time of 200 seconds, the difference of the waviness was 9.1 Angstrom and it was largely improved. It is considered that the waviness of the polishing pad 1 of Example 1 is improved since uniformity of the surface of the polishing pad 1 is excellent in that only the open portions 4 according to the foams 3 are formed on the surface comparing with the surface of the polishing pad of Example 1 at which a honeycomb shaped cell structure according to openings of the large cells 5 is formed.

What is claimed is:

1. A wet film manufacturing method of a polymeric foam sheet for a polishing sheet, comprising the steps of;
    coating approximately uniformly a polyurethane resin emulsion, which includes a polyurethane resin, a first organic solvent that the polyurethane resin can be dissolved, and a second organic solvent whose solubility to water is smaller than that of the first organic solvent and which controls coagulation of the polyurethane resin, to a base material; and
    soaking the base material coated by the polyurethane resin emulsion into a coagulation liquid whose main component is water,
    such that the resulting polymeric foam sheet has a polishing layer which is disposed inside a layer that defines a surface of the sheet, the polishing layer having a thickness which is greater than a thickness of the surface-defining layer, and the polishing layer having an approximately uniform distribution of foams to a plane orthogonal to a direction of the thickness of the polymeric foam sheet, said foams formed in the polishing layer having a volume larger than that of foams formed in the surface layer and which are communicated by a network of continuous holes, wherein a structure of said polishing layer foams remains substantially constant throughout said thickness of said polishing layer,
    wherein the second organic solvent is ethyl acetate, and the polyurethane resin emulsion is prepared by adding the second organic solvent of a range of from 20 parts to 45 parts to a polyurethane resin solution, that the polyurethane resin is dissolved into the first organic solvent, of 100 parts.

2. A wet film manufacturing method according to claim 1, wherein the method further comprises a step of removing the surface-defining layer from the polymeric foam sheet.

3. A wet film manufacturing method according to claim 1, wherein a ratio of a combined total of all of the cross sectional areas of said polishing layer foams over a cross sectional area of said polishing layer remains substantially constant in the thickness direction.

4. A wet film manufacturing method of a polymeric foam sheet for a polishing sheet, comprising the steps of;
    coating approximately uniformly a polyurethane resin emulsion, which includes a polyurethane resin, a first organic solvent that the polyurethane resin can be dissolved, and a second organic solvent whose solubility to water is smaller than that of the first organic solvent and which controls coagulation of the polyurethane resin, to a base material; and
    soaking the base material coated by the polyurethane resin emulsion into a coagulation liquid whose main component is water, and
    removing the surface-defining layer from the polymeric foam sheet,
    such that the resulting polymeric foam sheet has a polishing layer which is disposed inside a layer that defines a surface of the sheet, the polishing layer having a thickness which is greater than a thickness of the surface-defining layer, and the polishing layer having an approximately uniform distribution of foams to a plane orthogonal to a direction of the thickness of the polymeric foam sheet, said foams formed in the polishing layer having a volume larger than that of foams formed in the surface layer and which are communicated by a network of continuous holes, wherein a structure of said polishing layer foams remains substantially constant throughout said thickness of said polishing layer,
    wherein the second organic solvent is ethyl acetate, and the polyurethane resin emulsion is prepared by adding the second organic solvent of a range of from 20 parts to 45 parts to a polyurethane resin solution, that the polyurethane resin is dissolved into the first organic solvent, of 100 parts, and
    wherein a ratio of a combined total of all of the cross sectional areas of said polishing layer foams over a cross sectional area of said polishing layer remains substantially constant in the thickness direction.

* * * * *